United States Patent [19]

Koyama et al.

[11] Patent Number: 4,514,776
[45] Date of Patent: Apr. 30, 1985

[54] MAGNETIC HEAD AND METHOD OF MANUFACTURING THE SAME

[75] Inventors: Shoichi Koyama, Horinouchi; Tetsuya Iwata, Niigata, both of Japan

[73] Assignee: Alps Electric Co., Ltd., Tokyo, Japan

[21] Appl. No.: 376,117

[22] Filed: May 7, 1982

[30] Foreign Application Priority Data

May 8, 1981 [JP] Japan .................................. 56-69060
Jun. 17, 1981 [JP] Japan .................................. 56-93532

[51] Int. Cl.³ .......................... G11B 5/12; G11B 5/27; G11B 5/251; G11B 5/28
[52] U.S. Cl. .................................. 360/121; 360/118; 360/120
[58] Field of Search ............... 360/121, 125, 129, 118, 360/112, 119, 126; 29/602 A, 603

[56] References Cited

U.S. PATENT DOCUMENTS

| | | | |
|---|---|---|---|
| 3,964,103 | 6/1976 | Thompson et al. | 360/129 |
| 4,137,555 | 1/1979 | Sveceny | 360/129 |
| 4,176,384 | 11/1979 | Yang | 360/121 |
| 4,180,835 | 12/1979 | Okumura | 360/121 |
| 4,276,574 | 6/1981 | Baasch | 360/118 |
| 4,423,550 | 1/1984 | Fujioka | 29/603 |

*Primary Examiner*—Robert M. Kilgore
*Attorney, Agent, or Firm*—Guy W. Shoup; Gerard F. Dunne

[57] ABSTRACT

A magnetic head characterized in that a nonmagnetic material of an erasing core chip in which two erasing cores are coupled by the nonmagnetic material is provided with a groove portion and that a recording/reproducing core is inserted in the groove portion. The magnetic head can be fabricated by a method characterized by comprising the step of providing first and second orthogonal grooves in a face plate, the step of providing the groove portion in the nonmagnetic material of the erasing core chip, the step of inserting the recording/reproducing core in the first groove, inserting the erasing core chip in the second groove and inserting the recording/reproducing core in the groove portion of the nonmagnetic material, and the step of fixing the face plate, the recording/reproducing core and the erasing core chip with glass or the like and polishing a front surface of the face plate.

10 Claims, 6 Drawing Figures

MAGNETIC HEAD AND METHOD OF MANUFACTURING THE SAME

BACKGROUND OF THE INVENTION

The present invention relates to a magnetic head for a digital recording device such as a flexible disk, and also to a method of manufacturing the magnetic head.

A prior-art magnetic head of the specified type has been constructed as shown in FIGS. 1(a) and 1(b). FIG. 1(a) is an exploded perspective view showing the principal constituent parts of the magnetic head. A recording/reproducing core is formed with a recording/reproducing gap 1a and erasing cores 2 are juxtaposed on respective sides of the recording/reproducing core 1. A body 3 of a nonmagnetic substance, such as glass, is secured to the erasing core 2 and face plates 4 which are made of a ceramic or the like each have a groove portion 4a for receiving a corresponding erasing core 2. These constituent parts are assembled as follows. Using a jig (not shown), they are first fixed with an organic binder as illustrated in FIG. 1(b). Thereafter, they are coupled by melting the body 3 of glass.

At this time, erasing gaps 2a at a predetermined interval are formed between the side surfaces of the recording/reproducing core 1 and the erasing cores 2.

In the magnetic head of the above structure, however, the two erasing cores 2 and 2 and face plates 4 and 4 are respectively separate and independent of each other, resulting in the disadvantage that the assembling operations become complicated. As illustrated in FIG. 2, the proper position between the recording/reproducing core 1 and the erasing cores 2 and 2 may not be obtained, resulting in the disadvantage that the positional dimension A between the recording/reproducing gap 1a and the erasing core 2 and the dimension B of the erasing gap 2a are so out of line that the finished product may not operate properly.

SUMMARY OF THE INVENTION

The present invention has been made in order to eliminate the disadvantages described above, and has for its object to provide a magnetic head which may be assembled easily and with high precision.

In one aspect of performance of the present invention, a magnetic head is formed by a chip having two integral erasing cores coupled by a nonmagnetic substance and a recording/reproducing core inserted in a groove portion of the erasing core chip.

In another aspect of performance of the present invention, a method of manufacturing a magnetic head is characterized by comprising the step of providing first and second grooves substantially orthogonal to each other by cutting in a face plate made of a nonmagnetic substance, the step of providing a groove portion in a nonmagnetic substance of an erasing core chip in which two erasing cores are coupled by the nonmagnetic substance, the step of inserting a recording/reproducing core in said first groove, thereafter inserting said erasing core chip in said second groove and also inserting said recording/reproducing core in said groove portion of said nonmagnetic substance, and the step of fixing said face plate, said recording/reproducing core and said erasing core chip with a nonmagnetic substance such as glass and thereafter polishing a front surface of said face plate.

BRIEF DESCRIPTION OF THE DRAWINGS

FIGS. 3 to 5 illustrate a magnetic head according to the present invention, in which FIG. 3 is an exploded perspective view of essential portions showing the structures of the respective components, FIG. 4 is a perspective view for explaining the assemblage of a recording/reproducing core, erasing cores and a face plate, and FIG. 5 is a schematic perspective view showing the assembled the magnetic head.

PREFERRED EMBODIMENTS OF THE INVENTION

Figure 1A:
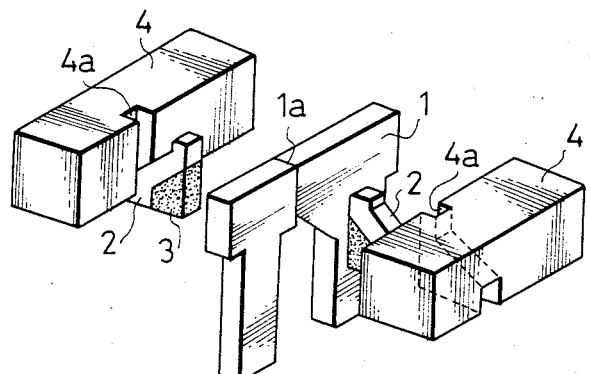
FIGS. 1(a) and 1(b) are perspective views of essential portions of a prior-art magnetic head.
Figure 1B:
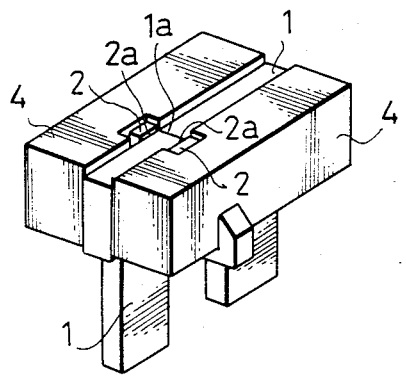
Figure 2:
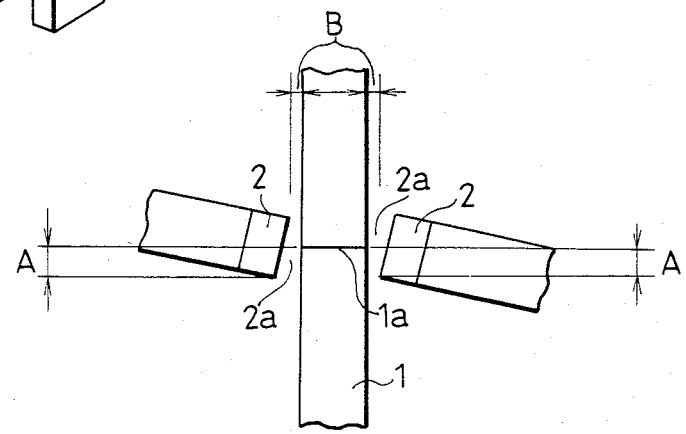
FIG. 2 is a schematic view for explaining the positional relationship between a recording/reproducing core and erasing cores.
Figure 3:
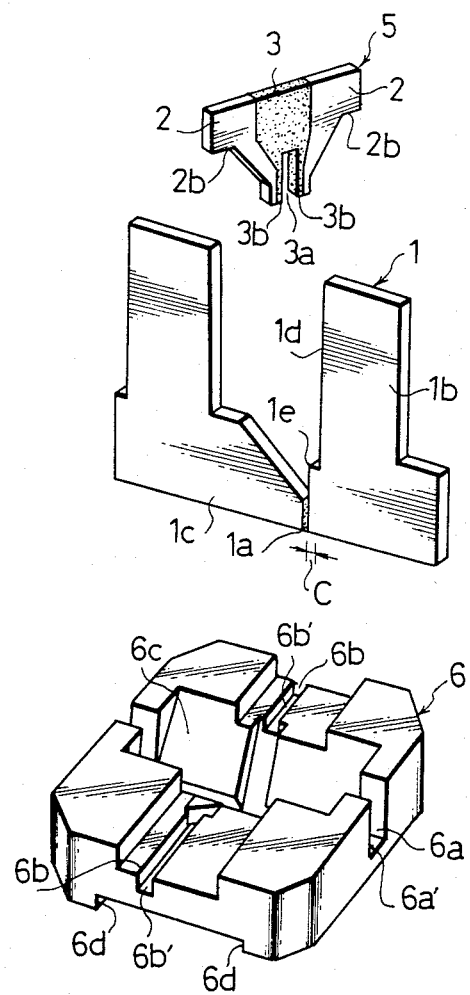
Figure 4:
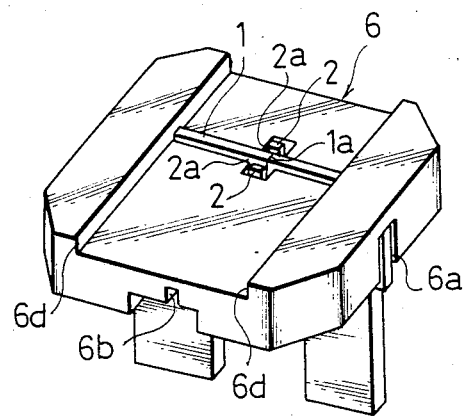
Figure 5:
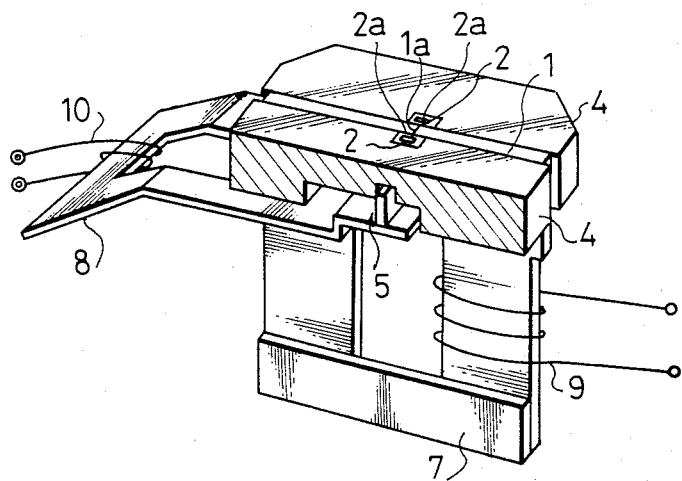

Hereunder, the present invention will be described with reference to FIGS. 3 to 5. FIG. 3 is an exploded perspective view which shows the principal constituent components of a magnetic head according to the present invention. A chip 5 forming an erasing core is provided with two erasing cores 2 and 2 made of a ferrite, Sendust or the like which are unitarily joined by the use of a nonmagnetic substance 3 such as glass. A groove portion 3a having a predetermined size is formed in a part of the nonmagnetic substance 3, and remaining portions 3b and 3b of the nonmagnetic substance 3 are left on the surfaces of the erasing cores 2 and 2 opposing to the groove portion 3a so as to form the dimensions of the erasing gaps. Protuberant portions 2b and 2b for positioning are respectively formed on the sides of the erasing cores 2 and 2.

Numeral 1 indicates a recording/reproducing core which is made of a ferrite, Sendust or the like and which is formed with a recording/reproducing gap 1a. One leg portion 1b of the core 1 is formed with a step portion 1e in advance so that a dimension C from an end face 1d to the gap 1a may have a predetermined value.

Numeral 6 indicates a face plate made of a ceramic or the like. It is formed with a first groove 6a and a second groove 6b which intersect orthogonally to each other and which serve to receive the recording/reproducing core 1 and the erasing core chip 5, respectively. In addition, a slanted groove 6c is provided in the central part of the face plate 6. Symbols 6a' and 6b' represent the bottoms of the first groove 6a and the second groove 6b which have predetermined depths from the front surface of the face plate 6, respectively.

Now, the assemblage of the constituent parts will be described. First, the recording/reproducing core 1 and the erasing core chip 5 are successively inserted into the first groove 6a and second groove 6b of the face plate 6 and placed on the corresponding bottoms 6a' and 6b'. At this time, the erasing core chip 5 is precisely positioned with its protuberant portions 2b fitted in the second groove 6b, and the other leg portion 1c of the recording/reproducing core 1 is inserted in the groove portion 3a of the nonmagnetic substance 3. Thereafter, the end face 1d of the leg portion 1b of the recording/reproducing core 1 is brought into abutment against the nonmagnetic substance 3 of the erasing core chip 5, and the step portion 1e is inserted into the groove portion 3a of the nonmagnetic substance 3. Thus, the three components of the recording/reproducing core 1, the erasing core chip 5 and the face plate 6 can be positioned.

Subsequently, a bonding material such as glass is melted in the slanted groove 6c of the face plate 6 so as to bind the respective components together.

Lastly, the front surface of the face plate 6 is polished thereby to grind away a joining portion 6d (refer to FIG. 4) of the first groove 6a. By removing the joining portion 6d, the face plate 6 can be separated into two parts, and unnecessary stresses acting on the face plate 6 due to the bonding material can be eliminated.

According to the assembling method thus far described, the combined dimensions of the recording/reproducing core 1 and the erasing cores 2 and the dimensions of the erasing gaps 2a can be readily made satisfactory. In constructing a magnetic head for a flexible disk, as illustrated in FIG. 5, a rear core 7 is mounted to the recording/reproducing core 1, and a U-shaped rear core 8 is disposed behind the two erasing cores 2 and 2 in order to magnetically bridge them.

Numeral 9 denotes a coil for recording/reproduction, and numeral 10 a coil for erasure.

As set forth above, according to the present invention, an erasing core chip 5 in which the two erasing cores 2 and 2 are made unitary through the nonmagnetic substance 3 is formed. This brings forth the effect that the handling and assembling operation of the erasing core chip 5 is very easy.

The end face 1d of the recording/reproducing core 1 inserted in the groove portion 3a of the erasing core chip 5 is held in abutment against the nonmagnetic substance 3 of the erasing core chip 5, so that the erasing core chip 5 and the recording/reproducing core 1 can be combined at precise positional dimensions.

Further, the protuberant portions 2b provided in the erasing cores 2 of the erasing core chip 5 are inserted in the groove 6b of the face plate 6 and placed on the bottom 6b' of the groove 6b, so that the erasing core chip 5 and the face plate 6 can be reliably positioned without using a jig or the like.

I claim:

1. A magnetic head having a recording/reproducing core and an erase core, said erase core being formed as a unitary chip element comprised of two erase core elements joined together by a nonmagnetic binding material, and means including a groove formed in said nonmagnetic binding material prior to assembly of said magnetic head and adapted to receive said recording-/reproducing core for positioning it relative said erase core.

2. A magnetic head according to claim 1, said recording/reproducing core having an end face adjacent the gap thereof, said end face being adapted to abut against said nonmagnetic binding material to position said recording/reproducing core relative said erase core.

3. A magnetic head according to claim 2, said recording/reproducing core having a step portion adjacent said gap and adapted to fit within said groove.

4. A magnetic head according to claim 1, said erase core being fitted within a grooved portion of a face plate and having means including protuberant portions extending laterally therefrom for engaging said grooved portion for aligning said erase core properly.

5. A mangetic head formed by a face plate made of nonmagnetic material and having first and second grooved portions extending orthogonally to one another, a recording/reproducing core fitted in one of said grooves, and an erasing core fitted within the other of said grooves, said erase core being formed as an unitary chip element comprised of two erase core elements joined together by nonmagnetic binding material, and means including a groove formed in said nonmagnetic binding material prior to assembly of said magnetic head and adapted to receive said recording/reproducing core for positioning it relative said erase core.

6. A magnetic head according to claim 5, said recording/reproducing core having an end face adjacent the gap thereof, said end face being adapted to abut against said nonmagnetic binding material to position said recording/reproducing core relative said erase core.

7. A magnetic head according to claim 6, said recording/reproducing core having a step portion adjacent said gap and adapted to fit within said grove.

8. A magnetic head according to claim 5, said erase core having means including protuberant portions extending laterally therefrom for engaging the grooved portion receiving said erase core for aligning said erase core properly.

9. A method of forming a magnetic head including the steps of forming an erase core as a unitary chip element comprised of two erase core portions joined together by a nonmagnetic binding material having a groove formed therein; a recording/reproducing core, and thereafter fitting said erasing core and said recording/reproducing core in respective grooved portions of a face plate arranged orthognally to one another with the gap portion of said recording/reproducing core fitting within said groove to assure proper alignment, and thereafter securing said erase core and recording-/reproducing core in position by fusing them in place with a nonmagnetic material.

10. A method according to claim 9, said face plate being divided along the groove receiving said recording/reproducing core so as to form two sections after said securing step.

* * * * *